Feb. 10, 1970   G. BRADU   3,495,153
BULBS FOR CATHODE TUBES, PARTICULARLY FOR TELEVISION TUBES
Filed Feb. 24, 1966

United States Patent Office 3,495,153
Patented Feb. 10, 1970

3,495,153
BULBS FOR CATHODE TUBES, PARTICULARLY FOR TELEVISION TUBES
Georges Bradu, Nemours, France, assignor to Societe des Verreries Industrielles Reunies du Loing, Paris, France
Filed Feb. 24, 1966, Ser. No. 529,882
Claims priority, application France, Mar. 4, 1965, 7,896
Int. Cl. H01j 5/00
U.S. Cl. 313—317                    10 Claims

ABSTRACT OF THE DISCLOSURE

A sturdy bulb for a cathode tube that is formed by welding both sides of a flat glass plane screen respectively to a curved viewing screen and a conical support wall. Apertures in either the curved viewing screen or the flat glass plate screen permit, respectively, for the filling of the space between the flat screen and the curved screen with transparent resin or the equalization of pressure on both sides of the flat screen.

---

Figure 1:
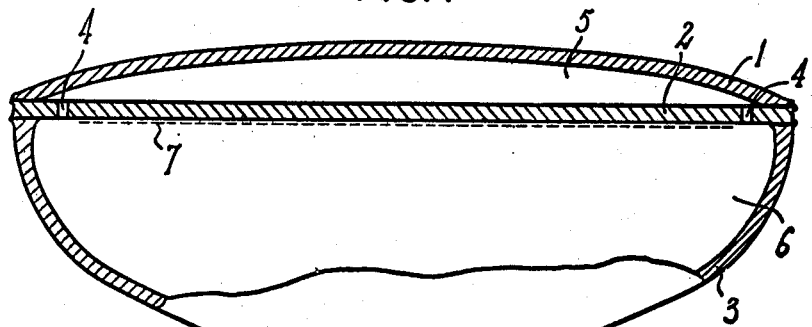

The envelope or bulb of a cathode tube, particularly of a television tube, is generally produced by welding two elements:

A viewing screen of glass through which the viewer sees the picture. This screen is plane for small models. In large models, on the other hand, the form of this screen is derived from a sphere or a torus to resist the pressure difference existing between the outside atmosphere and the vacuum inside the bulb.

A cone of glass or metal supporting in particular the electronic part.

Certain tubes are known where the picture is formed on a plane screen or target, placed inside the bulb in the connecting zone of the screen with the cone, and generally this plane screen is supported by a mounting resting on the bulb.

An object of the present invention is a bulb wherein the plane screen is secured on the bulb by welding it along its edges.

Due to the fact that it is secured by welding, the plane screen plays the role of a veil subtending at the same time both the cone and the screen.

Another object of the invention is a bulb in which the bulging viewing screen is separated from the cone by the plane screen, both the viewing screen and the cone being welded along the edge of the plane screen on opposite faces of this screen. The importance of the stresses in the connecting zone of the viewing screen with the cone is greatly reduced by this arrangement.

Extensometric measurements on a round tube of 36 cm. diameter have shown that extension stresses which are dangerous for the solidity of the viewing screen have been divided by three by the presence of the plane target welded to the cone-screen assembly.

In addition, the strengthening of the resistance of the bulb thus obtained can be used with advantage to provide in the viewing screen the following improvements which are also part of the invention:

The viewing screen can have a relatively small thickness. For example, in the case of a tube whose diagonal length is 49 cm., the screen can consist of a polished glass of 5 to 6 mm. thickness instead of the usual screen obtained by pressing, which has the inconvenience of being much thicker and which in addition, in the case of color television, requires frequently a particularly difficult polishing of its inner surface.

The viewing screen in the bulbs according to the invention can have a smaller bend than in the case of ordinary tubes, where the screen contributes more to the resistance of the assembly to the atmospheric pressure. This constitutes a gain both for the quality of viewing and for the reduction of the encumbrance in depth of the apparatus.

The fact that less contribution is demanded of the picture screen for the resistance of the assembly to the atmospheric pressure permits also to impart to its periphery over a certain length of flattened shape which is connected to the circumference of the plane screen. A viewing screen having such a shape can be easily obtained by bending a plane sheet of polished glass. The bulb having a plane contour, the mask and eventually the protective device against implosion which are assembled around and over the television tube when this bulb is mounted within a television set, can be of a simpler design and of an easier set up.

Still another object of the invention is a bulb comprising a plane inner screen wherein the luminescent layer has been deposited over the surface of the plane screen. The manufacture of such bulbs is greatly simplified. This is particularly advantageous in the case of the impression of the sensitive layer in tubes for color television.

Figure 2:
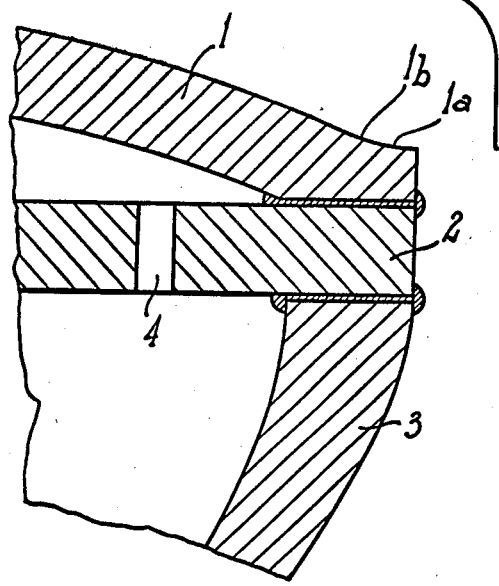
Figure 3:
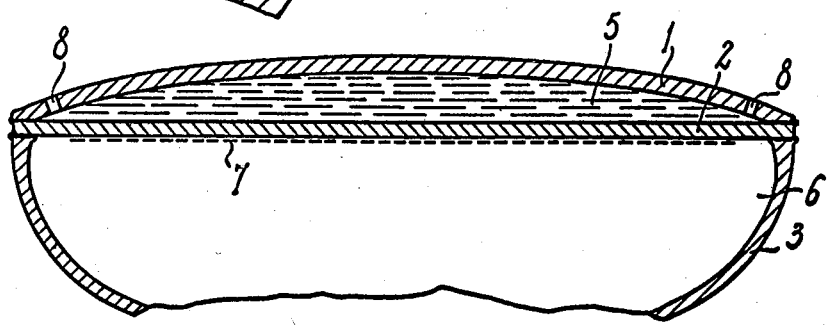

An example is described with reference to the attached figures, which represent:

FIG. 1—a section through a television tube according to the invention,

FIG. 2—a detailed section of a junction obtained by welding according to the invention, of the plane screen, the viewing screen and the cone, FIG. 3—a section of a television tube realized according to a variant of the invention.

In the television tube represented in the attached figures the viewing screen 1 is obtained by curving a flat sheet of glass, previously polished and which can have a thickness of about 6 mm.

A part of the viewing screen 1 rests on the screen 2 and has been carefully smoothed. The better resistance to the atmospheric pressure is ensured when the width of the flattened peripheral band 1a of the viewing screen is less than the thickness of the wall of the cone on which it rests by the intermediary of the border of the screen 2, as indicated in FIG. 2, so that the flattened band 1a rests completely upright on the section of this wall, including the inflection zone 1b which constitutes a transition zone between this band and the curved part of the screen. This curved part can undergo, if necessary, an antireflecting treatment at least on one of its faces.

The target 2 is also obtained by cutting a plane glass. It is evident that the glass constituting the screens 1 and 2 must have an expansion coefficient permitting the welding with the cone 3.

Holes 4 provided in the target 2 are destined to permit putting under vacuum the space 5 comprised between the viewing screen 1 and the plane screen 2, together with the inner space 6 of the cone. The diameter of this cone can be sufficiently great to permit mounting supports for known devices (not represented) which are required for color television. A luminescent layer 7 has been deposited on the plane screen 2 before the welding of the bulb.

The cone 3 is obtained by any known process. The part resting on the target 2 has been carefully smoothed.

The three elements 1, 2 and 3 assembled by welding by means of a material that does not require attaining the softening temperature of the elements to be assembled. A welding process can be used which consists in using a cement known under the name Pyroceram, manufactured by Corning Glass Works (U.S. Patent No. 2,889,952).

The invention can also be realized as shown in FIG. 3.

In this embodiment, the target does not comprise holes for the vacuum. These are provided at 8 in the viewing screen 1. There can be two of them.

During the evacuation of the space 6 inside the cone, these holes 8 are put in communication with a vacuum pumped by means of tubes connected to holes so that the plane screen 2 is subjected, as in the preceding case, to an equivalent pressure on these two faces.

When the vacuum obtained is sufficient in the space 6, the exhaust tubes to the pump are sealed.

By this process we obtain thus, if necessary, an evacuation of the space 5 independent of the space 6.

One of the tubes in the holes 8 is placed in communication with a source of transparent resin adapted to adhere to the glass. The space 5 is filled with said resin through said one tube until the resin rises in the other tube. When the resin polymerizes, the tubes connected with the holes 8 are withdrawn.

Under these conditions, if the index of refraction of the resin is identical with that of the glass, the quality of the picture is greatly improved thanks to the optical homogeneity of the medium traversed by the light rays.

Numerous other modifications and substitutions of equivalents will readily occur to those skilled in the art, after a study of the foregoing disclosure. Hence the disclosure is to be taken in an illustrative rather than a limiting sense; and all modifications, alterations, re-arrangements and substitutions within the scope of the subjoined claims, are reserved.

Having now fully disclosed the invention, what I claim and desire to secure by Letters Patent of the United States is:

1. A bulb for cathode ray tubes, particularly television tubes, comprising a conical wall portion, a curved viewing screen panel and an intermediate glass plane screen, the three elements are sealed together by welding the flanges of the curved viewing screen and the conical wall portion respectively to opposite faces of the intermediate plane screen adjacent the entire periphery thereof to effect a strengthening of the assembly.

2. A bulb according to claim 1, wherein the curvature of the viewing screen is rendered slighter than that of a usual bulb due to the relief of stresses developed on the periphery of the skirt of the viewing screen by the intermediate plane screen.

3. A bulb according to claim 2, wherein the intermediate plane screen is made of polished plane glass.

4. A bulb according to claim 3 wherein the intermediate plane screen is flat and supports a luminescent layer on which the image is formed.

5. The bulb of claim 3 wherein the periphery of the viewing screen is flat over a width not greater than the thickness of the conical wall.

6. The bulb of claim 3 wherein the viewing screen is not greater than 6 mm.

7. The bulb of claim 2 wherein the inner plane screen is provided with orifices connecting the spaces on both sides of the screen.

8. The bulb of claim 2 wherein holes are provided in the viewing screen and the plane screen with a transparent resin adhering to the glass.

9. The bulb of claim 7 wherein at least one of the faces of the viewing screen has been made anti-reflecting.

10. A bulb for cathode ray tubes, particularly television tubes, comprising a conical wall portion, a curved viewing screen, and an intermediate flat glass plane screen, the three elements are sealed together by welding the flanges of the curved viewing screen and the conical wall portion respectively to opposite faces of the intermediate plane screen adjacent the entire periphery thereof to effect a strengthening of the assembly, the width of the weld area being approximately the width of the conical wall, and one of the screens having at least one aperture in communication with both sides of the screen.

References Cited
UNITED STATES PATENTS

| | | | |
|---|---|---|---|
| Re. 25,791 | 6/1965 | Claypoole | 65—43 X |
| 2,160,081 | 5/1939 | Niclassen | 313—92 |
| 2,362,172 | 11/1944 | Swanson | 220—2.1 X |
| 2,676,109 | 4/1954 | Barnes et al. | 313—64 X |
| 2,761,990 | 9/1956 | Amdursky et al. | 220—2.1 X |
| 2,767,457 | 10/1956 | Epstein | 29—25.13 |
| 3,126,495 | 3/1964 | Kurtin | 313—92 X |
| 3,315,035 | 4/1967 | Applegath et al. | 313—317 X |

JOHN W. HUCKERT, Primary Examiner

J. R. SHEWMAKER, Assistant Examiner

U.S. Cl. X.R.

220—2.1; 313—89, 110